April 4, 1950        W. A. SCHULZE        2,502,596
REACTION OF HYDROGEN SULFIDE WITH OLEFINS
Filed Feb. 13, 1946
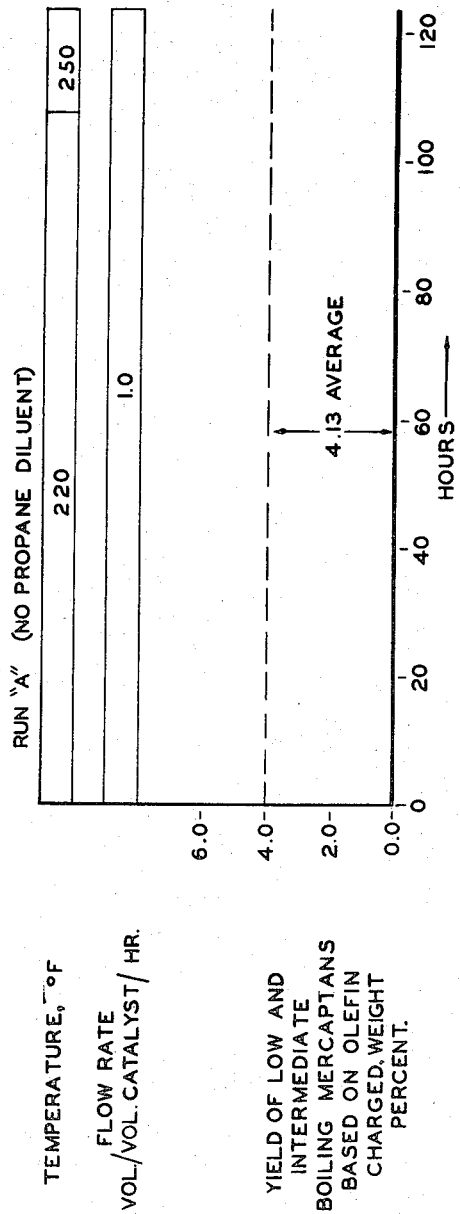
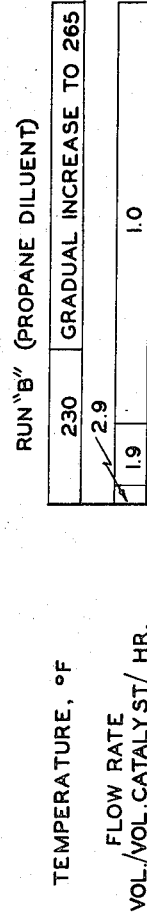
SYNTHESIS OF HIGH BOILING MERCAPTANS BY CATALYTIC REACTION OF H2S WITH OLEFIN POLYMER
INVENTOR.
W. A. SCHULZE
BY Hudson & Young
ATTORNEYS Patented Apr. 4, 1950

2,502,596

UNITED STATES PATENT OFFICE 2,502,596

REACTION OF HYDROGEN SULFIDE WITH OLEFINS

Walter A. Schulze, Bartlesville, Okla., assignor to Phillips Petroleum Company, a corporation of Delaware Application February 13, 1946, Serial No. 647,394

10 Claims. (Cl. 260—609)

This invention relates to a process for the reaction of olefins with hydrogen sulfide. In a specific embodiment this invention relates to the manufacture of mercaptans through the direct union of hydrogen sulfide with high molecular weight olefins over a suitable contact catalyst. An important aspect involves manufacturing mercaptans from olefin polymers in a manner avoiding production of mercaptans having fewer carbon atoms per molecule than the polymer reactant.

The catalytic reaction of hydrogen sulfide with olefins to produce organic sulfur compounds, particularly mercaptans and thioethers (sulfides), is well known. Recently, the higher molecular weight mercaptans have become increasingly important in industry. These are most satisfactorily produced by reacting an olefin polymer fraction of the desired number of carbon atoms per molecule with a molal excess of hydrogen sulfide over an active catalyst, such as a synthetic silica gel activated with small proportions of alumina as described in my copending application Serial No. 493,463, filed July 3, 1943, now U. S. Patent 2,426,646. In practice, however, I have found that even the most selective catalysts are so active as to result in the formation of very substantial amounts of mercaptans having fewer carbon atoms per molecule than the polymer feed stock. Whether the formation of light mercaptans is due to depolymerization followed by addition of $H_2S$ to resulting lower molecular weight olefins, or whether due to decomposition of some of the desired high molecular weight mercaptan product, or a combination of both, is not clear. However, whatever the mechanism, a very serious problem is presented.

The formation of lower molecular weight mercaptans as by-products when reacting olefin polymers with hydrogen sulfide of course causes a direct reduction in yield of the desired high molecular weight mercaptan. It also represents an uneconomic waste of the hydrogen sulfide which is consumed in forming the lower mercaptans. Furthermore, product separation is complicated by the presence of the undesired materials in the reaction effluents.

It is accordingly an important object of my invention to minimize the formation of lower molecular weight products when reacting hydrogen sulfide with olefin polymers to form high-boiling mercaptans having the same number of carbon atoms per molecule as the polymer.

Another problem arising in the manufacture of heavy mercaptans is the necessity for careful control of temperature in the catalyst chamber. In the operation of processes for the manufacture of organic sulfur compounds by a reaction between hydrogen sulfide and olefins, temperature ranges have been variously stated to range from 100 to about 600° F. in both catalytic and non-catalytic operations. Since in many instances the object was to produce mercaptans of low molecular weight, high temperatures favored this course. The production of low-boiling mercaptans from high-boiling olefins such as triisobutylene also is favored by relatively elevated temperatures. In such processes fluctuation in temperature over a considerable range is not necessarily critical.

Undesirable effects of excessive temperature gradients through the catalytic reaction zone in the manufacture of high-boiling mercaptans include: (1) depolymerization of the olefin feed; (2) production of low-molecular weight mercaptans; (3) consumption of $H_2S$ in the formation of alkyl sulfides; (4) production of saturated hydrocarbons; (5) decomposition of the desired high molecular weight mercaptans; (6) reduction of catalyst life; and (7) increased corrosion rates.

Since a suitable olefinic feed may comprise a heavy fraction of polymer resulting from polymerization of $C_3$-$C_5$ olefins, depolymerization may occur at temperatures exceeding about 400° F. with resultant conversion of the decomposition products to low molecular weight mercaptans which may not be the desired products of such a process. In extreme cases, excessive temperatures may result in the production of high-boiling hydrocarbons which seriously interfere with the purification of the high molecular weight mercaptans. Another deleterious effect of high temperatures is the decomposition of the product since it is known that the stability of the mercaptan homologs decreases with the increase in molecular weight and complexity of the hydrocarbon residue. Moderate temperatures maintained within relatively narrow limits are further desirable from the standpoint of catalyst life since sudden temperature gradients often result in degradation of catalytic activity through structural changes in crystal lattices. In general it may be stated that in the production of high molecular weight mercaptans over the preferred catalyst, controlled temperatures, compatible with economical reaction rates, are requisite for efficient operation of this invention.

Ordinarily exothermic heat of reaction in catalytic processes is removed by means such as the utilization of cooling coils installed in the catalyst bed or by external recirculation of the catalyst effluent through an external heat exchanger. Internal cooling coils function inefficiently with solid contact catalysts and give rise to zones of local overheating and overcooling with consequent adverse effects on catalyst activity and specificity. A further disadvantage is reflected in the unfavorable ratio of apparent volume of the catalyst case to the volume of catalyst due to the space taken up by the coils. The use of recirculation and external heat exchangers as a means of heat extraction and temperature control throughout the catalyst bed is ordinarily quite unsatisfactory due to the temperature gradient established in the reaction zone. Furthermore, in the mixed-phase operation of such a process, heat transfer in the exchanger is relatively inefficient, thus requiring excessive area of heat exchange surface.

Accordingly, a further object of this invention is to provide an efficient method of control of temperatures in mecaptan-forming reactions.

Another object is to provide a means for absorbing a large proportion of the exothermic heat of such reactions.

Reaction of hydrogen sulfide with heavy olefins may occasionally be effected in the vapor phase, but much preferably in mixed phase or liquid phase. At the temperature normally required, it is difficult to maintain the entire reaction mixture in a single liquid phase, due to the requirements of large amounts of hydrogen sulfide, for a molal excess of hydrogen sulfide over the olefin reactant is ordinarily needed in order to form mercaptans. Even in carrying out the reaction in mixed phase, high pressures are necessary to get the desired amounts of hydrogen sulfide into the liquid phase.

A further object of my invention, then, is to increase the solubility of hydrogen sulfide in a liquid reaction mixture comprising hydrogen sulfide and heavy olefins.

Another object is to minimize the pressure required to carry out the mixed phase reaction of hydrogen sufide with heavy olefins to form mercaptans.

Regardless of the care used to protect the catalyst from damage or deterioration, the activity of the catalyst gradually decreases with use. Ordinarily, this results in a lowering of the reaction rate, for with the decline in catalyst activity, the quantity of heat liberated is reduced, the temperature gradient through the catalyst bed declines and the reaction is still further slowed. This cumulative effect continues until the temperature drops so low that the reaction ceases.

A further object of the present invention is to control the absorption of exothermic heat in such reactions so as to maintain the temperature rise in the reactor, and the rate of reaction, substantially constant as catalyst activity declines.

Another object is to maintain the substantially constant reaction rate and at the same time avoid the production of the less-desired lower mercaptans.

Further objects and advantages of the invention will be apparent, to one skilled in the art, from the accompanying disclosure and discussion.

I have found quite unexpectedly that the production of intermediate and lower molecular weight mercaptans may be very markedly and effectively minimized by the procedure of adding substantial amounts of propane ($C_3H_8$) to the mixture of olefin polymer and hydrogen sulfide which is being contacted with the catalyst. This effect is revealed in the drawing, which shows in the form of a chart the result of two mercaptan-synthesizing runs, run A utilizing hydrogen sulfide and a heavy olefinic polymer feed stock, and run B utilizing the same reactants plus propane. Detailed data are given in Example I below.

These two runs, as brought out by the charts of the drawing, clearly reveal the remarkable action of propane in decreasing the amount of low and intermediate molecular weight mercaptans produced. No temperature gradient existed across the catalyst beds of runs A and B, hence this result of decreased amounts of lower mercaptans when using propane is in addition to the similar effect obtained by using propane to decrease the temperature gradient through large catalyst beds, described below.

This application is a continuation-in-part of my copending application Serial No. 516,482 filed December 31, 1943 and issued September 9, 1947 as U. S. Patent 2,427,309, which in turn is a continuation-in-part of copending application Serial No. 493,465 filed July 3, 1943, now abandoned; the present application likewise is a continuation-in-part of said abandoned copending application Serial No. 493,465, filed July 3, 1943. As disclosed in said applications, another use of propane is to limit the temperature rise which occurs from the inlet to the outlet of the reaction zone due to the exothermic nature of the mercaptan-forming reaction. I have found that by the incorporation of controlled quantities of propane in feed to the catalyst chamber, reaction temperature can be controlled within rather narrow limits. By this means it is possible to hold the exothermic temperature increase under commercial reaction conditions to from 25 to 75° F., depending on the proportion of propane charged. In this process, it is often desirable to maintain the temperature increase within the catalyst case at not more than about 50° F. when the molal charge composition of olefin:$H_2S$:propane corresponds to 1:2:2. By increasing the percentage of propane, even closer limits can be obtained; however, quantities of propane greater than about 10 to 15 mols per mol of olefin are not usually practicable.

Propane is particularly applicable for use as a diluent in this process because of its ease of separation from the products and unreacted olefin; thus the effluent from the catalyst is merely subjected to a flash vaporization to remove the propane and unreacted hydrogen sulfide as a single stream. The hydrogen sulfide-propane stream may be then returned to the feed tank. One especially advantageous method of operating is to flash the total reactor effluents to take off a vapor fraction containining all the $H_2S$ aand only part of the propane. The remainder of the propane remains in the liquid product. By this means, the propane serves as a separating agent, insuring complete removal of hydrogen sulfide in the vapor without allowing any product or unreacted olefin to contaminate the hydrogen sulfide thus-separated.

In one specific embodiment of this invention the feed for the mercaptan reaction is made up of 1 molecular proportion of $C_{12}$ to $C_{14}$ olefins, 2 molecular proportions of hydrogen sulfide and 4.5 molecular proportions of propane. Under a pressure of about 1000 pounds gage, the charge stock is preheated to a temperature of 250° F. before being pumped to a catalyst case containing a suitable catalyst for effecting the reaction, such as a synthetic silica-alumina gel catalyst. The flow rate is maintained at about 2 to 6 liquid volumes of feed per volume of catalyst per hour, depending on the activity of the catalyst. Under these conditions the catalyst case temperature is maintained between 250 and 270° F. with a conversion of about 30 per cent of the olefin to mercaptan of the corresponding carbon content, per pass. The total effluent is flashed to remove propane and hydrogen sulfide which is returned to the feed line. The stabilized effluent is then stripped of its unreacted olefin under reduced pressure to yield a kettle product containing about 95 per cent high-boiling mercaptan which is valuable as a synthetic rubber modifier.

In operating this invention the feed is preferably preheated to a temperature favoring maximum rate of reaction compatible with minimum formation of by-products. Ordinarily preheat temperatures of between about 200–300° F. are preferred with specific values varying somewhat with the type and activity of the catalyst employed. The amount of propane charged to maintain the reaction temperature within the desired range will depend largely on depth of conversion of olefin to mercaptan. The temperature rise in commercial-size catalyst chambers may amount to 100° F. or higher if this invention is not practiced. By appropriate variation of the propane to olefin mol ratio between about 2:1 and 10:1, the temperature increase can be limited to between about 50 and 15° F., depending on the extent of dilution. It is often advantageous to vary the propane concentration to maintain constant reaction temperature with degradation of catalyst activity. Thus, as the catalyst declines in activity with continued use, the proportion of propane may be reduced to maintain the optimum temperature range, as will now be described.

One of the primary purposes of the use of propane diluent is to prevent the development of a large temperature gradient in the reactor bed, and a runaway reaction resulting from an undue exothermic rise. Preferably this temperature rise should not exceed about 50° F. It may be controlled to remain below this level by the use of propane as above disclosed. It is also important to maintain the reaction consistently and to prevent the temperature from falling to such an extent that the reaction slows down and stops. I have found that propane may be employed in a certain manner to prevent the temperature decrease and resulting cessation of the reaction. As the silica-alumina or other contact catalyst ages with use, its activity undergoes some decline. The lowered activity results in a reduction in the quantity of heat liberated, and in turn the temperature gradient through the bed declines and the reaction is still further slowed. This vicious circle continues until temperature has dropped so low that reaction has substantially ceased. If propane diluent is being used the effect may even be accelerated due to the more efficient removal of heat which is evolved.

I have found, however, that if I control the quantity of propane used, in such a manner as to bear an inverse relationship to the catalyst age, I may maintain the reaction within the desired limits for a long period, and until such time as the catalyst is substantially spent. As the activity declines and exothermic heat liberation is reduced, I proportionately reduce the quantity of propane diluent used, thereby removing less of the heat, and allowing the temperature to remain high enough for the reaction to continue unabated.

It has been stated above that a temperature rise of over about 50° F. is undesirable, and if it becomes much over this value, say 75 or more, the reaction accelerates itself so rapidly as to run away. Exothermic rises of about 40 to 50° F. in the bed are often optimum, a good conversion obtaining with little danger of accelerated decomposition setting in. When the rise is only 10 or 15° F., the conversion is too low to be practical.

In the operation of my process I control the quantity of propane used in such a manner as to maintain the optimum reaction through the bed, say at a 40° F. exothermic rise at the desired temperature level. As the catalyst ages I continually (or by steps) decrease the quantity of propane diluent to consistently maintain this differential. The rate of reaction is never appreciably lowered. The process is continued for long periods until it is no longer possible to maintain a suitable conversion by this means, and the catalyst is spent. Examples IV and V below show this operation in specific detail.

It is generally preferred to operate the present process, when producing mercaptans, with a molal excess of hydrogen sulfide over the olefin. The mol ratio of hydrogen sulfide to olefin in the feed may vary from 1:1 to 5:1 or higher; however, the preferred ratio is ordinarily between 1.5 and 2.5. In this connection, the increased solubility of hydrogen sulfide in liquid propane over its solubility in heavy olefin polymers, for instance, is of great value. Thus, by admixing liquid propane with polymer, and operating in mixed phase, less pressure is required to maintain a given quantity of $H_2S$ in solution. Furthermore, propane is quite superior in this respect to the heavier paraffins, which have occasionally been suggested for use as diluents in mercaptan-forming reactions. For instance, hydrogen sulfide is 50% more soluble in liquid propane than in liquid dodecane, which is the paraffin corresponding to the $C_{12}$ olefin which is a preferred charge stock of this invention.

The problem of hydrogen sulfide recovery from the raw effluent is greatly facilitated by the employment of propane in this process. The pressure is reduced from about 1000 pounds gage to 75 pounds while the raw effluent is passing from the catalyst case to the flash stabilizer. With the addition of supplementary reboiler heat the hydrogen sulfide and propane are taken overhead and compressed to the liquid state. The propane serves as a carrier for the hydrogen sulfide and makes possible the simple but complete removal of the hydrogen sulfide from the effluent at relatively low pressures. The propane-hydrogen sulfide stream, along with added hydrogen sulfide, is returned to the catalyst feed system where it is blended with olefin. Because of the mild conditions employed in this process substantially complete recovery of propane may be realized.

Further treatment of the stabilized and hydrogen sulfide-free effluent consists in a vacuum stripping operation for recovery of unreacted high-boiling olefinic hydrocarbons. Where some propane is allowed to remain in the stabilized effluent as described above, it may also be recovered at this point if desired. The final operation is carried out under a reduced pressure of from 3 to 10 mm. of mercury in order to avoid decomposition of the high-boiling mercaptans. The kettle product from the stripping operation constitutes the product and is substantially free of non-mercaptan material.

While this invention may be practiced to advantage in reacting hydrogen sulfide with any olefin having four or more carbon atoms per molecule, it has particular advantages when reacting hydrogen sulfide with olefins of high molecular weight to form mercaptans of high molecular weight. It gives especially desirable results when producing mercaptans of high molecular weight by reacting olefins contained in polymer fractions, resulting from polymerization of lower-boiling olefins, which boil not lower than about 330° F.

Although I have used this process primarily when passing the reaction mixture once-through a fixed catalyst bed, it may also be practiced with other process modifications, as when the catalyst, in finely divided form is suspended in the reaction mixture, or when a portion of the reaction mixture is recirculated in a closed cycle, either through a fixed catalyst bed, or with a flowing catalyst.

The use of propane in the manner described herein has especially beneficial results when producing mercaptans from olefins and hydrogen sulfide at temperatures of about 100 to about 400° F. in the presence of synthetic gel catalysts comprising a major portion of silica and a minor proportion (about 1 to about 5% by weight) of an oxide of a metal belonging to one of groups III B and IV A of the periodic system, including boron, aluminum, gallium, indium, and thallium in group III B, and titanium, zirconium, hafnium, and thorium in group IV A. The use of such catalyst for such reactions is disclosed in my copending application Serial No. 493,463, filed July 3, 1943. Other catalysts, especially other solid catalysts which are active at temperatures below about 400° F. for promoting the formation of mercaptans from olefins and hydrogen sulfide, such as clays, "solid" phosphoric acid, etc., may be used in the present process. Such catalysts are almost invariably more prone to form high proportions of low-boiling mercaptans than is the synthetic silica-alumina, and the use of propane is therefore highly advantageous. Beneficial effects of propane are likewise obtainable when liquid catalysts, such as a boron fluoride-phosphoric acid complex, are employed.

It is preferred to operate at a pressure of about 500 pounds per square inch, and pressures up to about 1500 pounds, or more, may be used as desired. At the conclusion of the reaction the propane and unreacted hydrogen sulfide are removed, as a gaseous mixture, from high-boiling products. This step is readily accomplished by a simple flashing operation at a low pressure, such as at about 50 to about 150 pounds.

Examples showing specific advantages of the invention, and representing specific methods of operation, will now be given. However, it is of course understood that the examples are merely illustrative of, rather than limiting, the scope of the invention.

*Example I*

Data for runs A and B, shown in the drawing, are given here. The catalyst used was a synthetic silica-alumina gel catalyst prepared by a contacting an acidic hydrous silica gel with an aqueous solution of aluminum sulfate to effect adsorption of hydrous alumina, and subsequently washing the resulting gel and then drying it at a temperature of about 200–300° F. This silica-alumina catalyst contained about 3% alumina by weight, on a dry basis. The olefinic feed stock fraction had a boiling range of 330–390° F., and had been fractionated out of the liquid produced by polymerizing normally gaseous olefins. The reaction in each case was effected at a pressure of 1000 pounds per square inch gage. The mol ratio of $H_2S$ to olefin, and the amount of propane, were as follows:

| | Run A | Run B |
|---|---|---|
| Mols $H_2S$ per mol olefin | 1.55 | 1.53 |
| Mols propane per mol olefin | None | 1.03 |

The variables of catalyst, feed stock, pressure, and ratio of $H_2S$ to olefin, were the same in the two runs, as described above. As shown in the drawing, the reaction conditions of flow rate (liquid) and temperature varied somewhat between the two runs, as it was desired to determine the effect of certain changes in these variables. However, the differences were not significant with respect to production of low and intermediate mercaptans. These conditions were within the same general range, and the temperature was actually more severe, and thus tending more toward production of the lighter mercaptans, in run B where the propane was used.

The yield of desired heavy mercaptans was about 35 weight per cent, based on olefin charged, in each run. The yield of low and intermediate boiling mercaptans (largely butyl and octyl mercaptans), however, averaged 4.13 per cent in run A, but was lowered by the use of propane to only 2.02 per cent in run B.

As these runs were made under close control in small laboratory chambers, where temperature gradients did not exist, it is apparent that the beneficial effects of propane are not solely due to any temperature control which may be effected thereby.

*Example II*

A mixture of 14.2 mol per cent triisobutylene, 28.6 mol per cent hydrogen sulfide, and 57.2 mol per cent propane at 250° F. and 1000 pounds gage pressure was passed at a flow rate of 2 liquid volumes per volume of catalyst per hour through a large catalyst case containing a silica-alumina catalyst of the type described in Example I. The temperature in the reaction zone leveled out at 270 to 280° F. The composition of the unstabilized effluent was as follows:

| | Mol per cent |
|---|---|
| Triisobutylene | 10.0 |
| Hydrogen sulfide | 24.5 |
| Intermediate mercaptans | 0.5 |
| $C_{12}$ mercaptans | 4.5 |
| Propane | 60.5 |
| | 100.0 |

After removal of hydrogen sulfide and propane, the triisobutylene and lower mercaptans were fractionated out of the heavy mercaptan under diminished pressure, and a substantially pure, heavy mercaptan fraction was recovered as a product.

In the absence of the propane diluent, the exit temperature from the catalyst ranged from 70 to 100° F. above the inlet temperature, and excessive decomposition of feed and product was noted.

*Example III*

Heavy butylene polymer, having a boiling range of 338–360° F., was employed as the source of olefin in this experiment. The feed composition expressed as mol per cent was as follows: heavy polymer (calculated as triisobutylene), 14.2; hydrogen sulfide, 28.6; propane, 57.2. The feed mixture was preheated to 200–210° F. and reacted in the presence of a silica-alumina catalyst under a pressure of 1000 p. s. i. g. and at a flow rate of 2 liquid volumes per volume of catalyst per hour. The presence of the propane diluent without other means of heat dissipation held the temperature in the reaction zone at 240–250° F. Approximately 30 mol per cent of the butylene polymer was converted to high-boiling mercaptans with only negligible formation of low-boiling products.

After removal of H₂S, propane and unreacted olefinic material, as described in Example II, a kettle product having the following characteristics was obtained:

| | |
|---|---|
| Boiling range, °F. (760 mm.) | 450–470 |
| Density, 60/60 | 0.870–0.885 |
| Mercaptan sulfur, per cent (wt.) | 14–15 |

In the absence of propane diluent, excessive depolymerization of the olefinic polymer was incurred.

Example IV

A mixture of 14.2 mol per cent triisobutylene, 28.6 mol per cent hydrogen sulfide and 57.2 per cent propane, as in Example II, was charged to a chamber containing silica-alumina catalyst as described, at 1000 p. s. i. g. pressure and 2 liquid volumes per hour. The inlet temperature was 250° F. The temperature in the reaction zone leveled out initially at about 280° F. The ratio of propane to olefin was gradually reduced over a period of twenty-five days to a level of twenty mol per cent of the feed. At the end of this time it was no longer possible to maintain the temperature of 280° F. in the reacting zone. In a few more days the temperature dropped to below 265° F. and the run was terminated.

In a parallel test in which the propane was maintained at 57.2 mol per cent of the feed the temperature of the reaction zone had declined to below 270° F. in fourteen days and the run was soon terminated. The products recovered in both cases were substantially similar to those given in Example II.

Example V

Heavy butylene polymer having a boiling range of 338–360° F. was passed with H₂S and propane over the catalyst of Example IV, using the same mol ratios of feed, pressure and flow rate. Inlet temperature was 210° F. and temperature in the reaction zone settled at 250° F. The ratio of propane to olefin was decreased from 2:1 to 0.35:1 in steps through a period of twenty days to maintain temperature at 230° F. When the initial quantity of propane was left unchanged, temperature dropped below this level in ten days. In these cases it was possible to continue reaction for a somewhat longer time than these values before it was finally necessary to terminate the runs.

I claim:

1. A process which comprises continuously passing a mixture of a heavy olefin of more than four carbon atoms per molecule and hydrogen sulfide through a bed of mercaptan-synthesizing solid contact catalyst at mercaptan-synthesizing conditions of temperature and pressure, and continuously admixing with said mixture for passing through said catalyst sufficient propane to avoid a temperature rise across said catalyst bed of more than 50° F. and to substantially minimize production of mercaptans of lower molecular weight than the mercaptan corresponding to said olefin.

2. The process of claim 1, in which a propane to olefin mol ratio within the range of 2:1 to 10:1 is employed allowing a temperature rise across said catalyst bed of from 15 to 50° F.

3. The process of claim 1, in which said solid contact catalyst is a synthetic gel catalyst comprising a major portion of silica and a minor portion of alumina.

4. A process which comprises continuously passing a mixture of an olefin polymer and hydrogen sulfide through a bed of mercaptan-synthesizing solid contact catalyst at mercaptan-synthesizing conditions of temperature and pressure, continuously admixing with said mixture for passing through said catalyst sufficient propane to avoid a temperature rise across said catalyst bed of more than about 50° F. and to substantially minimize production of mercaptans of lower molecular weight than the mercaptan corresponding to said olefin polymer, and as the catalyst activity declines with use decreasing the amount of propane being added to said mixture at a rate of decrease such as to maintain the temperature rise across the catalyst bed substantially constant thus avoiding substantial decrease in rate of reaction normally caused by loss in catalyst activity.

5. The process of claim 4, in which said olefin polymer is a fraction boiling not lower than about 330° F.

6. The process of claim 4, in which a propane to olefin mol ratio within the range of 2:1 to 10:1 is employed.

7. The process of claim 4, in which effluents of the mercaptan-synthesizing reaction are subjected to fractionation to produce a low-boiling fraction comprising essentially all the unreacted hydrogen sulfide and only part of the propane and a higher-boiling fraction comprising the balance of the propane, unreacted olefin, and mercaptan product, the low-boiling fraction is recycled to the reaction, and the mercaptan product is separated from the higher-boiling fraction.

8. The process of claim 4, in which the reaction is effected in mixed liquid-vapor phase, and in which sufficient propane is employed so that the amount of hydrogen sulfide dissolved in the liquid phase is greater than would otherwise be dissolved in the liquid olefin alone.

9. In a process for reacting heavy olefins of more than four carbon atoms per molecule with hydrogen sulfide to produce organic sulfur compounds in the presence of a catalyst capable of catalyzing said reaction, the improvement which comprises initiating the reaction with a fresh catalyst in the presence of sufficient propane diluent to avoid a temperature rise of more than 50° F. during reaction, and as the catalyst declines in activity with continued use, reducing the proportion of said propane diluent in the reaction mixture while maintaining the reaction temperature substantially constant within the range optimum for said reaction.

10. A process for producing mercaptans of high molecular weight, which comprises reacting olefins contained in a polymer fraction boiling not lower than about 330° F. and not higher than about 400° F. with a molar excess of hydrogen sulfide in the presence of a mercaptan-synthesizing solid contact catalyst at a reaction temperature not greater than about 400° F. and in the presence of propane in an amount such that the temperature increase during the reaction due to exothermic heat does not exceed about 50° F., and under a reaction pressure of at least about 500 pounds per square inch gage, passing effluents of said reaction to a separating zone operated at a lower pressure and separating therein by simple flashing a gaseous mixture comprising propane and hydrogen sulfide from a liquid mixture comprising mercaptans so produced, compressing at least a portion of said gaseous mixture and returning same to said reaction, and recovering from said liquid mixture as a product of the process a mercaptan fraction having substantially the same number of carbon atoms per molecule as said polymer fraction.

WALTER A. SCHULZE.

REFERENCES CITED

The following references are of record in the file of this patent:

UNITED STATES PATENTS

| Number | Name | Date |
|---|---|---|
| 2,052,268 | Williams et al. | Aug. 25, 1936 |
| 2,101,096 | Reuter et al. | Dec. 7, 1937 |
| 2,209,190 | Currie | July 23, 1940 |
| 2,244,196 | Herbert | June 3, 1941 |
| 2,252,138 | Rutherford et al. | Aug. 12, 1941 |
| 2,326,559 | Munday | Aug. 10, 1943 |
| 2,427,307 | Schulze | Sept. 9, 1947 |

OTHER REFERENCES

Duffey et al., "Industrial and Engineering Chemistry," vol. 26, No. 1, pages 91 to 93 (1934).

Certificate of Correction

Patent No. 2,502,596            April 4, 1950

WALTER A. SCHULZE

It is hereby certified that error appears in the printed specification of the above numbered patent requiring correction as follows:

Column 12, line 13, list of references cited, for the patent number "2,427,307" read *2,427,309*;

and that the said Letters Patent should be read with this correction therein that the same may conform to the record of the case in the Patent Office.

Signed and sealed this 11th day of July, A. D. 1950.

[SEAL]

THOMAS F. MURPHY,
*Assistant Commissioner of Patents.*